(12) United States Patent
Miyamoto

(10) Patent No.: US 6,518,999 B1
(45) Date of Patent: *Feb. 11, 2003

(54) ELECTRONIC STILL CAMERA HAVING LINE THINNING OUT DURING CONTINUOUS SHOOTING MODE

(75) Inventor: Ryosuke Miyamoto, Chiba-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,917

(22) Filed: Dec. 16, 1997

Related U.S. Application Data (63) Continuation of application No. 08/389,543, filed on Feb. 15, 1995, now abandoned, which is a continuation of application No. 07/998,821, filed on Dec. 30, 1992, now abandoned.

(30) Foreign Application Priority Data

Jan. 14, 1992 (JP) .............................. 04-004903

(51) Int. Cl.⁷ .......................... H04N 5/225; H04N 5/238
(52) U.S. Cl. ................. 348/220; 348/222; 348/296; 348/312; 348/366; 386/110; 386/120
(58) Field of Search ................................ 348/220, 221, 348/222, 229, 230, 294, 311, 312, 317, 319–324, 439, 458; 396/89, 124, 213, 233, 234; 386/38, 40, 45, 109, 110, 117, 120, 121, 125; H04N 5/335

(56) References Cited

U.S. PATENT DOCUMENTS

| | | | | |
|---|---|---|---|---|
| 4,322,752 A | * | 3/1982 | Bixby | 348/312 |
| 4,910,606 A | * | 3/1990 | Kinoshita et al. | 348/362 |
| 5,012,271 A | * | 4/1991 | Nishimura | 396/234 |
| 5,206,730 A | * | 4/1993 | Sakai | 348/220 |
| 5,363,137 A | * | 11/1994 | Suga | 348/302 |
| 5,659,654 A | * | 8/1997 | Nagasawa | 386/120 |
| 5,875,280 A | * | 2/1999 | Takaiwa et al. | 386/120 |
| 5,991,504 A | * | 11/1999 | Hori | 386/112 |

* cited by examiner

Primary Examiner—Wendy R. Garber
Assistant Examiner—Ngoc-Yen Vu
(74) Attorney, Agent, or Firm—Robin Blecker & Daley

(57) ABSTRACT

An electronic still camera comprises an image sensor which allows each of its horizontal lines to be individually specified so that a video signal contained in each specified horizontal line can be read, a storage circuit for storing the video signal read from the image sensor, a selecting circuit for selecting a high-speed continuous shooting mode, and a controlling circuit for executing, when the high-speed continuous shooting mode is selected by the selecting circuit, control to effect a high-speed reading for reading the video signal from the image sensor by thinning out the horizontal lines of the image sensor, and to cause the storage circuit to store video signals for a plurality of pictures obtained by the high-speed reading.

11 Claims, 9 Drawing Sheets

| (1) | (2) | (3) | (4) |
|---|---|---|---|
| (5) | (6) | (7) | (8) |
| (9) | (10) | (11) | (12) |
| (13) | (14) | (15) | (16) |

| (1) | (2) | (3) | (4) |
|---|---|---|---|
| (5) | (6) | (7) | (8) |
| (9) | (10) | (11) | (12) |
| (13) | (14) | (15) | (16) |

FIG.9(b)

| (1) | (2) | (3) | (4) |
|---|---|---|---|
| (12) | (13) | (14) | (5) |
| (11) | (16) | (15) | (6) |
| (10) | (9) | (8) | (7) |

ELECTRONIC STILL CAMERA HAVING LINE THINNING OUT DURING CONTINUOUS SHOOTING MODE

CROSS REFERENCE TO RELATED APPLICATIONS

This application is a continuation of application Ser. No. 08/389,543, filed on Feb. 15, 1995 now abandoned, which is a continuation of application Ser. No. 07/998,821, filed Dec. 30, 1992, now abandoned.

BACKGROUND OF THE INVENTION

1. Field of the Invention

The present invention relates to an electronic still camera and, more particularly, to high-speed continuous shooting suitable for the electronic still camera.

2. Description of the Related Art

An electronic still camera (also called the still video camera) has conventionally been provided with a continuous shooting mode, and the electronic shutter function of an image sensor such as a CCD has been utilized to increase the continuous shooting speed of the electronic still camera. As compared with a silver-salt camera, such a continuous shooting function is useful for the electronic still camera which uses an erasable and re-recordable medium.

To gain the continuous shooting speed, various proposals have been made. A primary factor which determines the continuous shooting speed is the operating time of mechanisms. The continuous shooting speed is not affected by the shutter of the electronic still camera since an electronic shutter is utilized. However, since a magnetic head is mechanically arranged, the time required to move the magnetic head influences the continuous shooting speed.

To solve the problem, it has been proposed to provide an electronic still camera having an image memory.

In such an electronic still camera, image data read from an image sensor are thinned out to prepare image data having a data size reduced to 1/16 or 1/25 of the original data size, and the thus-prepared image data are stored in the image memory so that the image data are sequentially subjected to continuous shooting. A series of data which has been prepared in this manner is read from the image memory and written to a video floppy disk. At this time, since a 1V (vertical scanning) period is necessarily needed to complete a reading from the image sensor, the 1V period constitutes a primary factor which determines the continuous shooting speed.

Regarding the high-speed continuous shooting, the above-described electronic still camera has the problems described in the following paragraphs (1) to (3).

(1) Since the 1V period (1/60 second) is required to complete a reading from the image sensor, it is difficult to shoot a rapidly moving subject.

(2) Even while a subject is not moving, recording is performed, so that a number of useless exposures are produced.

(3) If a plurality of exposures which have been recorded as one picture are reproduced, the motion of a subject is difficult to grasp.

SUMMARY OF THE INVENTION

An object of the present invention which has been made in the light of the above-described problems is to provide an electronic still camera which is capable of effecting continuous shooting at a far higher speed, which does not produce a large number of useless exposures during recording, and which is capable of reproducing an image so that the motion of a subject can be easily grasped.

To achieve the above-described object, according to several aspects of the present invention, there is provided an electronic still camera which is arranged as described in the following paragraphs (1), (2) and (3).

(1) In accordance with one aspect of the present invention, there is provided an electronic still camera which comprises an image sensor which allows each of its horizontal lines to be individually specified so that a video signal contained in each specified horizontal line can be read, memory means for storing the video signal read from the image sensor, selecting means for selecting a high-speed continuous shooting mode, and controlling means for executing, when the high-speed continuous shooting mode is selected by the selecting means, control to effect a high-speed reading for reading the video signal from the image sensor by thinning out the horizontal lines of the image sensor, and to cause the memory means to store video signals for a plurality of pictures obtained by the high-speed reading.

(2) In accordance with another aspect of the present invention, there is provided an electronic still camera which comprises an image sensor which allows each of its horizontal lines to be individually specified so that a video signal contained in each specified horizontal line can be read, memory means for storing the video signal read from the image sensor, selecting means for selecting a high-speed continuous shooting mode, decision means for comparing a video signal for one picture which has been read from the image sensor with a video signal for one picture which was immediately previously stored in the memory means, and determining whether both of the video signals represent a substantially identical image, and controlling means for executing, when the high-speed continuous shooting mode is selected by the selecting means, control to effect a high-speed reading for reading the video signal from the image sensor by sampling the horizontal lines of the image sensor, and, if the decision means determines that a read picture is substantially identical to a picture immediately previously stored in the memory means, to discard a video signal indicative of the read picture.

(3) In accordance with another aspect of the present invention, the electronic still camera described in the above paragraph (1) or (2) further comprises reproducing means for reproducing a series of pictures, which are stored with the high-speed continuous mode selected, so that the pictures are reproduced at predetermined time intervals one at a time.

According to the arrangements described in the above paragraphs (1), (2) and (3), if the high-speed continuous shooting mode is selected, during reading from the image sensor, the horizontal lines are thinned out and high-speed reading is performed. According to the arrangements described in the above paragraphs (2) and (3), while the high-speed continuous shooting mode is selected, if a subject does not move, a video signal read from the image sensor is discarded. According to the arrangement described in the above paragraph (3), pictures which are recorded in the high-speed continuous mode are reproduced at predetermined time intervals one at a time.

The above and other objects, features and advantages of the present invention will become apparent from the following detailed description of a preferred embodiment of the present invention, taken in conjunction with the accompanying drawings.

DETAILED DESCRIPTION OF THE PREFERRED EMBODIMENT

A preferred embodiment of the present invention will be described below with reference to the accompanying drawings.

Figure 1:
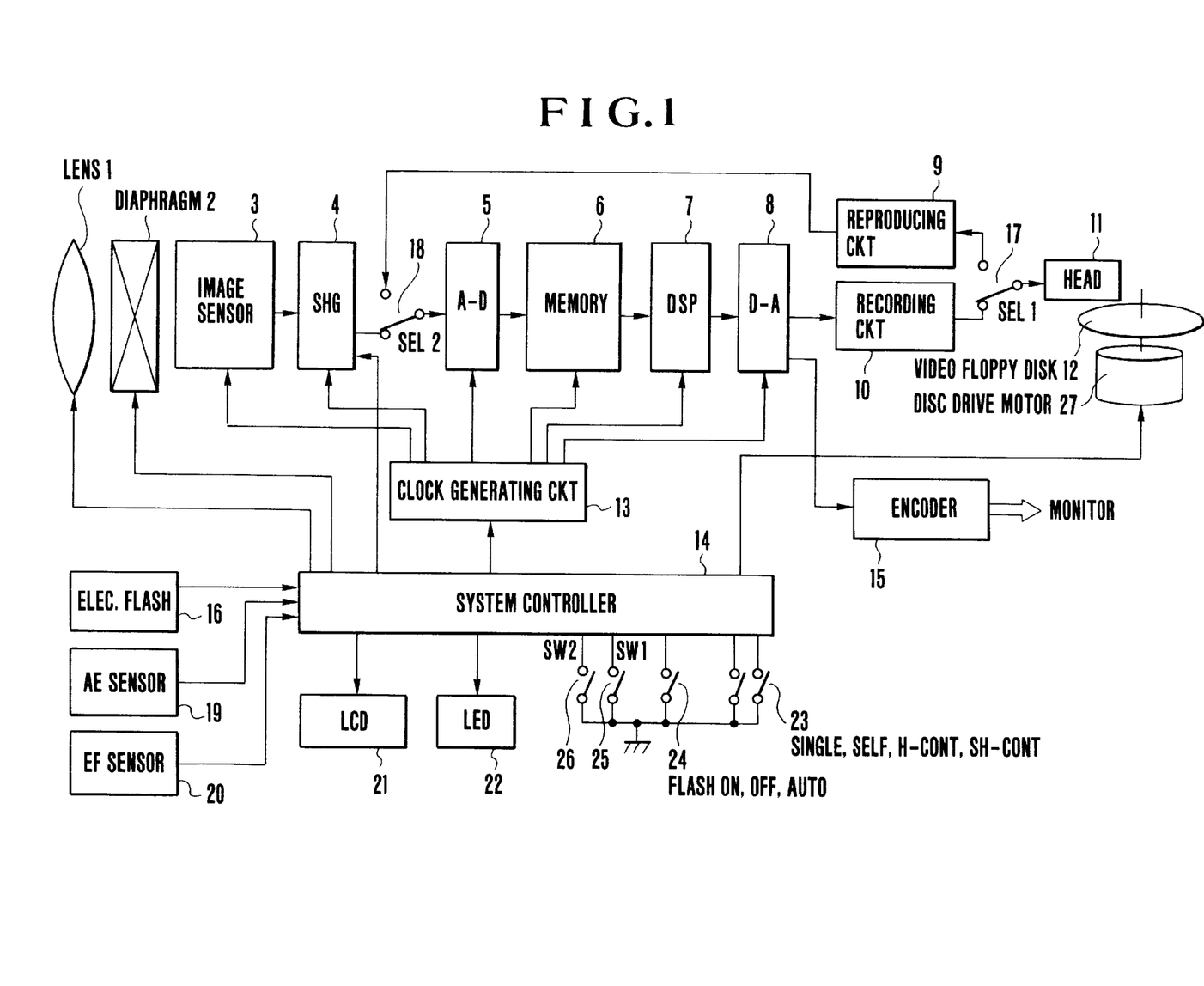
FIG. 1 is a block diagram of an embodiment of the present invention.

FIG. 1 is a block diagram schematically showing the preferred embodiment of an electronic still camera according to the present invention.

The electronic still camera shown in FIG. 1 includes a lens 1, a diaphragm 2 which utilizes a turret type of diaphragm (not shown), an image sensor 3, such as a general MOS sensor, the horizontal lines of which can be read on a line-by-line basis, a sample-and-hold gamma (SHG) circuit 4 for sampling and holding image data read from the image sensor 3 and executing gamma correction of the sampled and held image data, an A-D converter 5 for converting analog image data into digital image data, a memory 6, using a RAM or the like, for storing image data for sixteen exposures, a digital signal processor (DSP) 7 for executing signal processing, a D-A converter 8 for converting digital image data into analog image data, a reproducing circuit 9, a recording circuit 10, and a recording-reproducing head 11. Reference numeral 12 denotes a video floppy disk which serves as a magnetic recording medium.

The shown electronic still camera also includes a clock generating circuit 13 for controlling the timing of each of the image sensor 3, the SHG 4, the A-D converter 5, the memory 6, the DSP 7 and the D-A converter 8. The shown electronic still camera also includes a system controller 14, using a microcomputer or the like, for executing mode switching and sequential control, an encoder 15 which operates during a reproducing mode, a flash unit 16, switches 17 and 18 each of which switches according to switching between the reproducing mode and a recording mode, a light measuring (AE) sensor 19, a flashing controlling sensor 20, a liquid-crystal display 21 for providing visual display as to various modes, a track number and the like, an LED 22 which blinks during self-timer shooting, a shooting-mode selecting switch 23 for selecting a single shooting mode, a self-timer shooting mode, a high-speed continuous shooting (H-Cont) mode or an extremely-high-speed continuous shooting (SH-Cont) mode, a flash mode switch 24 for selecting "flash on", "flash off" or "auto-flash", switches SW1 25 and SW2 26 which serve as trigger switches for initiating a recording sequence, and a disk drive motor 27.

First of all, a normal recording sequence will be described below.

When a release button (not shown) is pressed to turn on the switch SW1 25, the disk drive motor 27 is started up to initiate recording on the video floppy disk 12. The system controller 14 reads measured-light data from the AE sensor 19 and performs a light-measurement computation. When the release button is further pressed to turn on the switch SW2 26, the diaphragm 2 is driven up to an aperture value determined by the light-measurement computation. Then, exposure of the image sensor 3 is executed at a predetermined electronic shutter speed.

The image data stored in the image sensor 3 is read in accordance with a clock signal generated by the clock generating circuit 13. The SHG 4 samples and holds the read image data and executes gamma correction of the sampled and held image data. The analog image data outputted from the SHG 4 is converted into digital image data by A-D conversion executed by the A-D converter 5. The digital image data is passed through the memory 6 and is subjected to signal processing in the DSP 7. The processed digital image signal is subjected to D-A conversion in the D-A converter 8, and the analog output of the D-A converter 8 is recorded on the video floppy disk 12 through the switch 17 and the recording-reproducing head 11.

The recording sequence executed during the single shooting mode is as described above. High-speed continuous shooting is realized by repeating the recording sequence while the switch SW2 26 is on.

Figure 2:
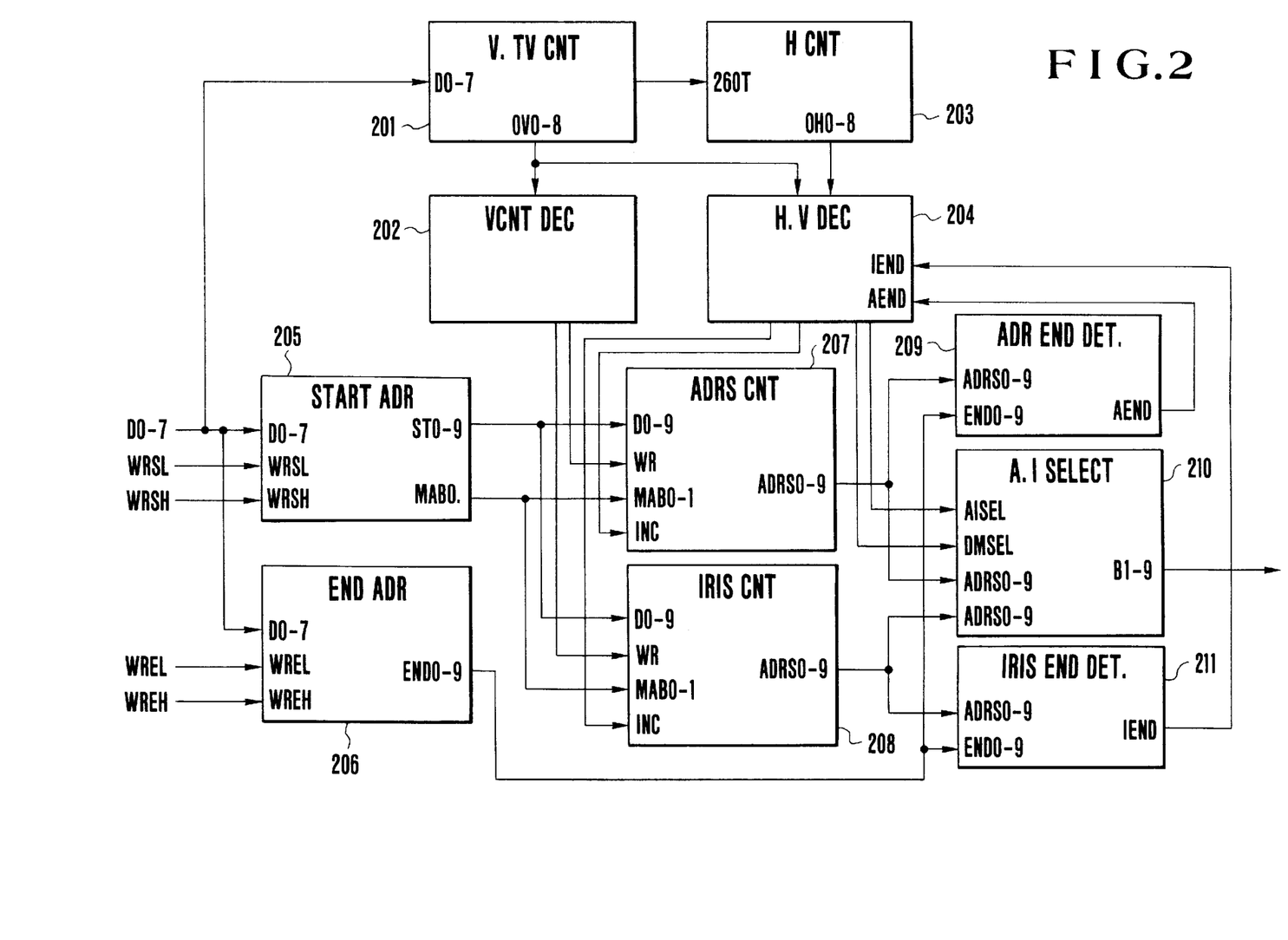
FIG. 2 is a block diagram of the counters of the clock generating circuit shown in FIG. 1.
Figure 3:
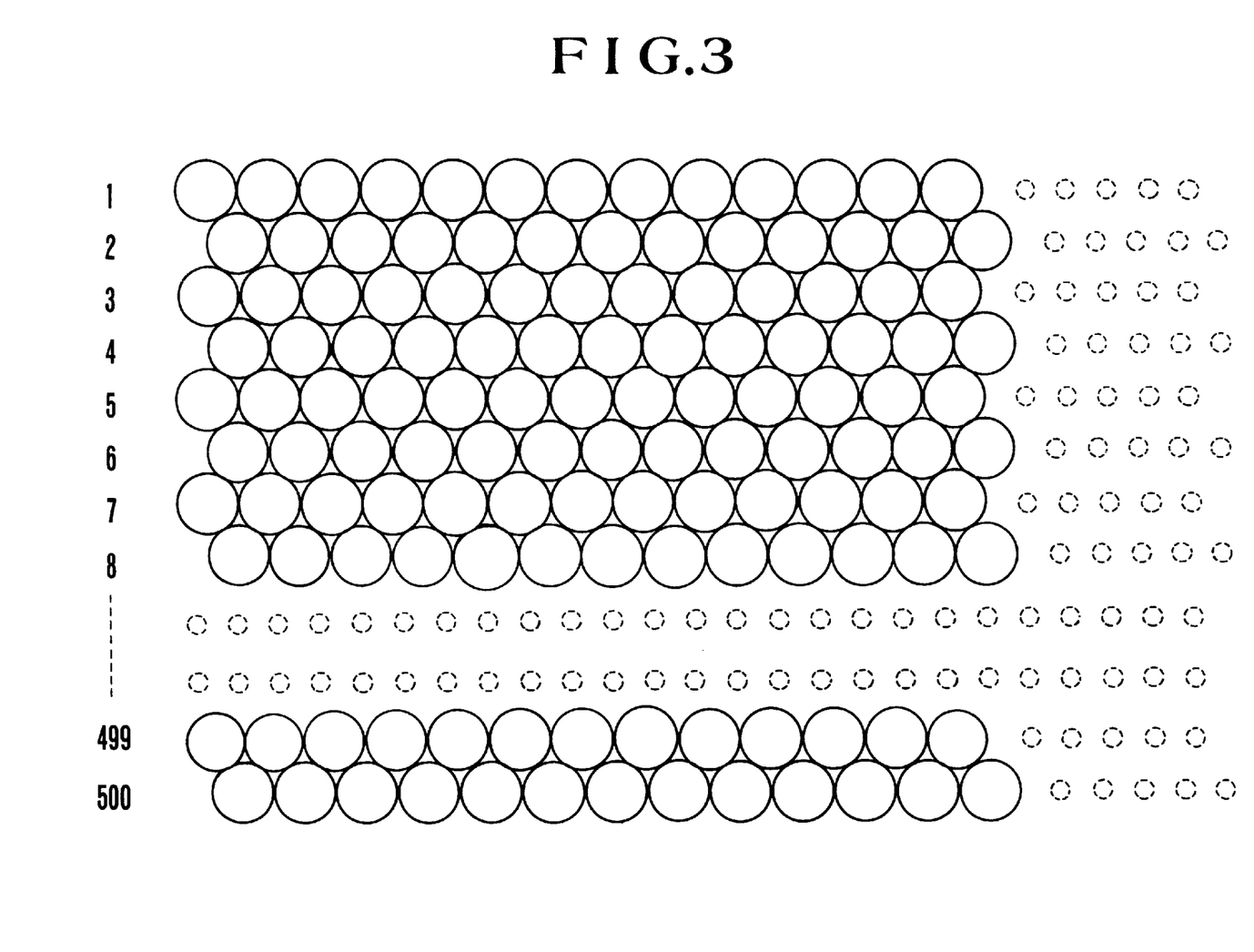
FIG. 3 is an explanatory view of the image sensor shown in FIG. 1.

FIG. 2 is a block diagram showing counters disposed in the clock generating circuit 13 for controlling the image sensor 3. FIG. 3 is an explanatory view showing the image sensor 3 the horizontal lines of which can be read on a line-by-line basis.

Referring to FIG. 3, five hundred effective lines are arranged in the vertical direction, and image data are read from two adjacent lines in a zigzag manner through the two adjacent lines during one horizontal period (hereinafter referred to as "1H period"). Among the lines shown in FIG. 3, each pair of adjacent lines constitutes one horizontal line, that is, each pair of lines 1 and 2, lines 3 and 4, ..., and lines 499 and 500 constitutes one horizontal line.

Referring to FIG. 2, the clock generating circuit 13 includes a counter (V.TV counter) 201 which serves as a vertical counter and counts an electronic shutter speed, a decoder 202 for generating timing from an output from the counter 201, a horizontal counter 203, a decoder 204 for generating timing from an output from each of the counters 201 and 203, a start address 205 for setting the address of a line at which reading is to be started, an end address 206 for setting the address of a line at which reading is to be ended, an address counter 207, an iris counter 208, an address-end detector 209, an address-iris selector 210, and an iris-end detector 211.

Figure 4:
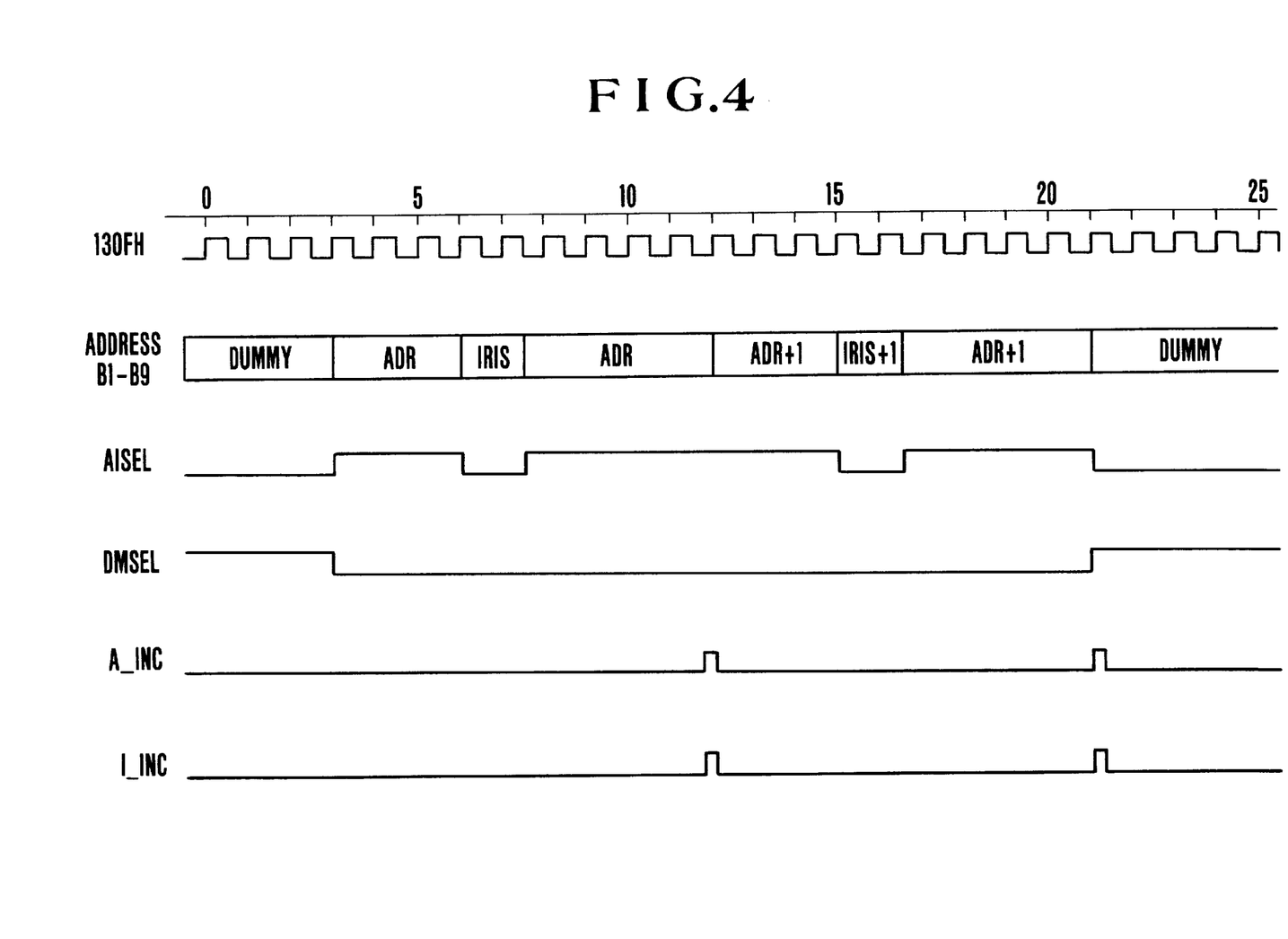
FIG. 4 is a timing chart showing the timing of selection of an address and an iris.

FIG. 4 is a timing chart showing the timing of selection of an address and an iris during the first 1H period. The term "address" represents that image data is read from a line specified by an address, and the term "iris" represents that a line specified by an iris is cleared.

The time taken until a line specified by the iris is read according to the address constitutes a shutter speed (time). This shutter speed (time) is determined by an integer multiple of one horizontal period (H).

Figure 5:
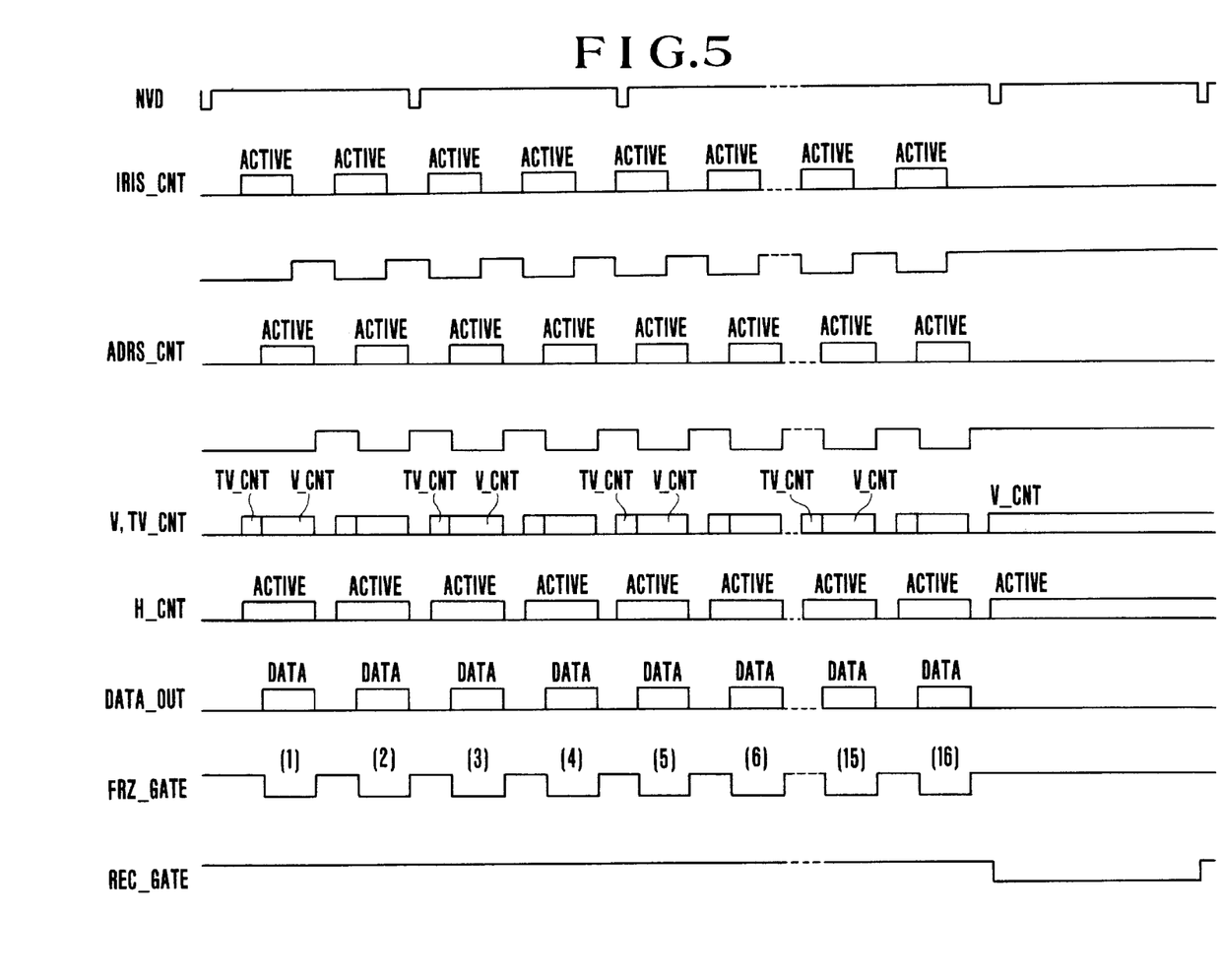
FIG. 5 is a timing chart showing the operation of each counter shown in FIG. 2.

FIG. 5 is a timing chart showing the state of operation of each of the counters shown in FIG. 2. In FIG. 5, there is shown a case where the horizontal lines of one picture are thinned out to ¼, and a vertical synchronizing signal (NVD) is added for reference.

First, a reading start address and a reading end address are respectively preset in the start address 205 and the end address 206 shown in FIG. 2. Simultaneously, "¼" is set as the rate at which the horizontal lines of one picture are thinned out. Then, a multiple of "H" which is equivalent to a shutter speed is set in the V.TV counter 201. The timing of "H" is generated from an output from the H counter 203, and an iris is set in address buses B1 to B9 as shown in FIG. 4. The H counter 203 counts up at 260FH (FH: horizontal frequency), and is cleared when a count of 260 is reached. The V.TV counter 201 counts down by one each time the H counter 203 reaches the count of 260.

In the meantime, since an increment signal (INC) is supplied from the H.V decoder 204 at the timing shown in FIG. 4, the iris counter 208 counts up by two during each 1H period. In the case of start address 1, the first and second lines (1 and 2) are cleared during the first "H", and subsequently the iris counter 208 counts up by four in the order of 5 and 6, 9 and 10 and so on.

The V.TV counter 201 is made to count down in this manner, and when a count of 0 is reached, the image sensor 3 proceeds from an image-data store enable state to an image-data read enable state. In this case, the address counter 207 starts sequential counting at a start address. For example, if TV=20H, the signals shown in FIG. 4 are as follows: AISEL and DMSEL are outputted from the H.V decoder 204, then switched by the address•iris selector 210, and then outputted to the address buses B1 to B9 so that DUMMY=0, ADR=1, IRIS=81, ADR+1=2 and IRIS+1=82 are obtained.

Figure 6:
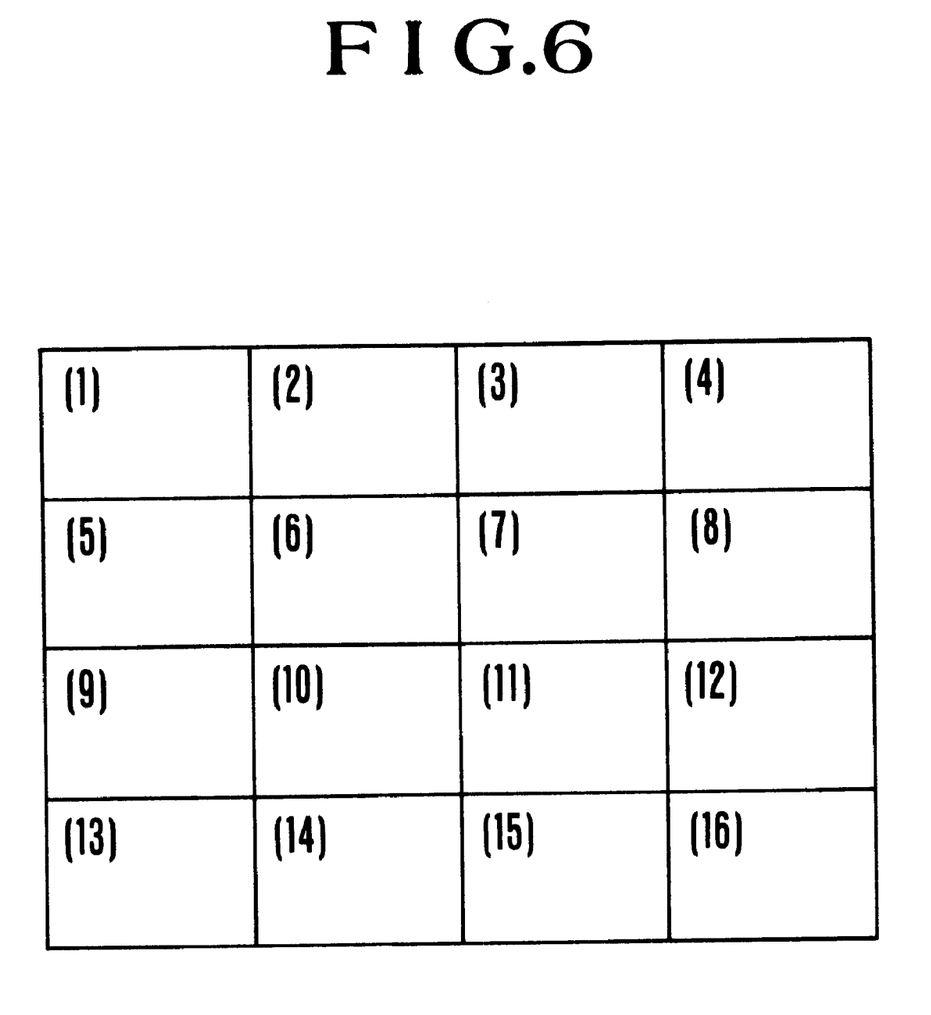
FIG. 6 is a view showing a picture formed by sixteen-exposure continuous shooting.

The address counter 207 similarly counts up in accordance with the increment signal. Then, a freeze gate signal (FRZ_GATE) (1) is outputted so that the image data for the two lines selected in the above-described manner are stored in the memory 6 of FIG. 1. The image data read out in this manner are stored in an area on the memory 6 which corresponds to a part (1) of the picture shown in FIG. 6.

The H counter 203 and the V counter 202 are made to count up to continue address counting and iris counting.

If the iris-end detector 211 detects that the iris counter 208 has counted up to a count indicative of the end of the reading, the iris-end detector 211 outputs an iris count end signal (IEND) so that the increment signal (INC) is inhibited from being outputted to the iris counter 208.

Similarly, if the address-end detector 209 detects that the address counter 207 has counted up to a count indicative of the end of the reading, the address-end detector 209 outputs an address count end signal (AEND) so that the increment signal (INC) is inhibited from being outputted to the address counter 207.

Then, at the time of the end of reading of the last pixel on the last line, FRZ_GATE is returned from its lower level to its high level and the operation of storing image data for one exposure in the area (1) of the memory 6 is completed.

By repeating the above-described operation, further image data are stored in the respective areas (2) to (6) of the memory 6. If the operation of storing the image data in the areas (1) to (16) of the memory 6 is completed, the disk drive motor 27 is started up, and after the rotation thereof becomes stable, reading from the memory 6 is started. The image data read from the memory 6 are recorded on the video floppy disk 12 through the DSP 7, the D-A converter 8, the recording circuit 10 and the recording•reproducing head 11 in accordance with a signal REC_GATE. In this manner, sixteen exposures are recorded on one track by the high-speed continuous shooting.

In the present embodiment, the reading time required to complete a reading from the image sensor 3 is determined by how the horizontal lines are thinned out. If "¼" is set as the rate at which the horizontal lines of one picture are thinned out, the reading time becomes (¼)V (vertical period) which is constant at approximately 4 msec. Accordingly, a continuous shooting speed is determined by a shutter speed, that is, a value which is preset in the V.TV counter 201.

In the present embodiment, although a thin-out operation in the vertical direction is realized by reading image data from the image sensor 3 every fourth line, a thin-out operation in the horizontal direction is realized by reducing the conversion clock frequency of the A-D converter 5 to ¼ or by thinning out image data at the time of writing into the memory 6.

Figure 7:
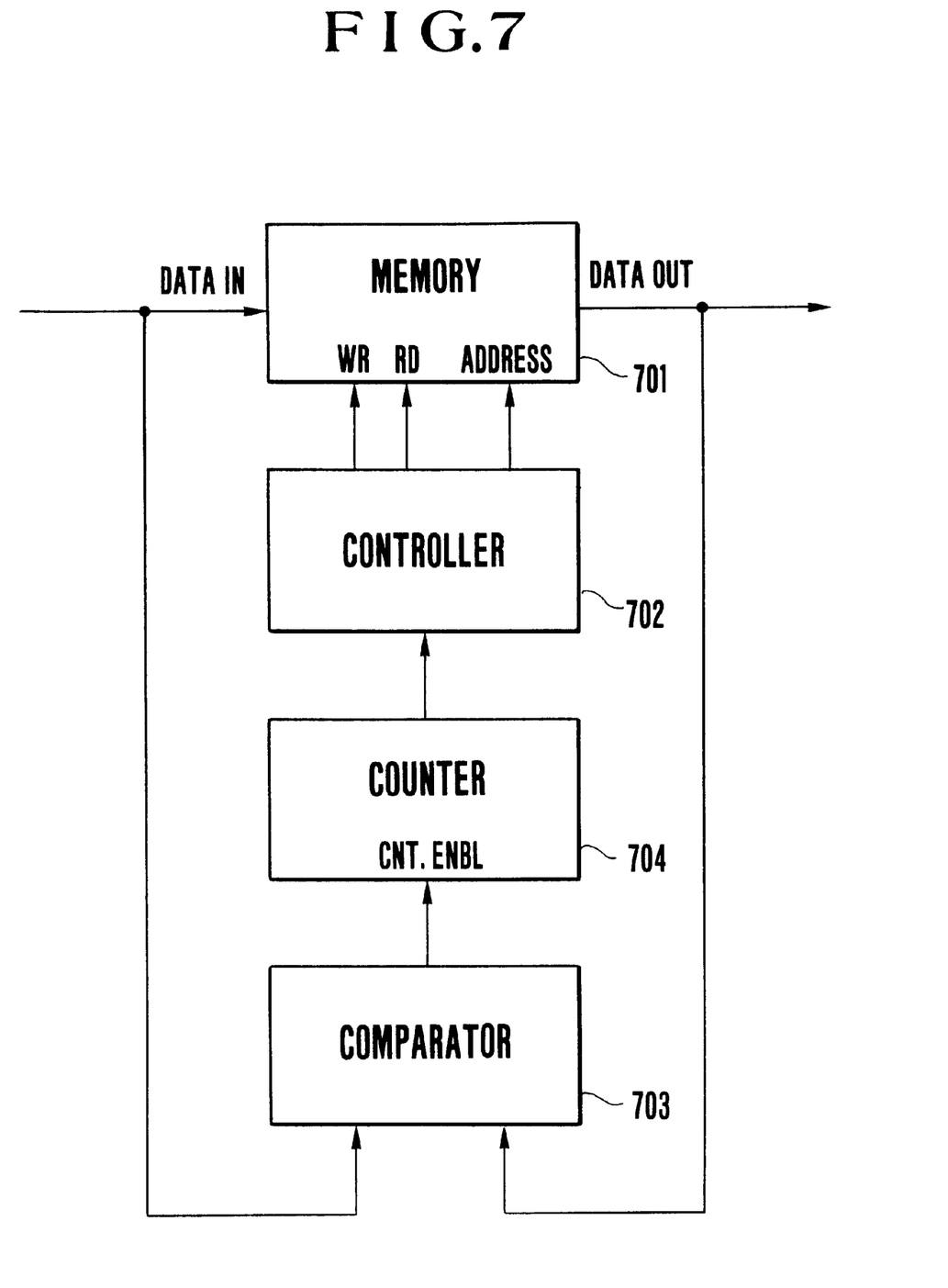
FIG. 7 is a block diagram of the memory shown in FIG. 1.

FIG. 7 is a block diagram of the memory 6. The memory 6 includes a memory 701 for storing image data, a controller 702 for controlling writing, reading and addresses, a comparator 703 for making a comparison between input image data and read image data, and a counter 704 which is set to its count-enable state when the output of the comparator 703 is at its high level (when the difference between the input image data and the read image data is above a certain level).

Figure 8:
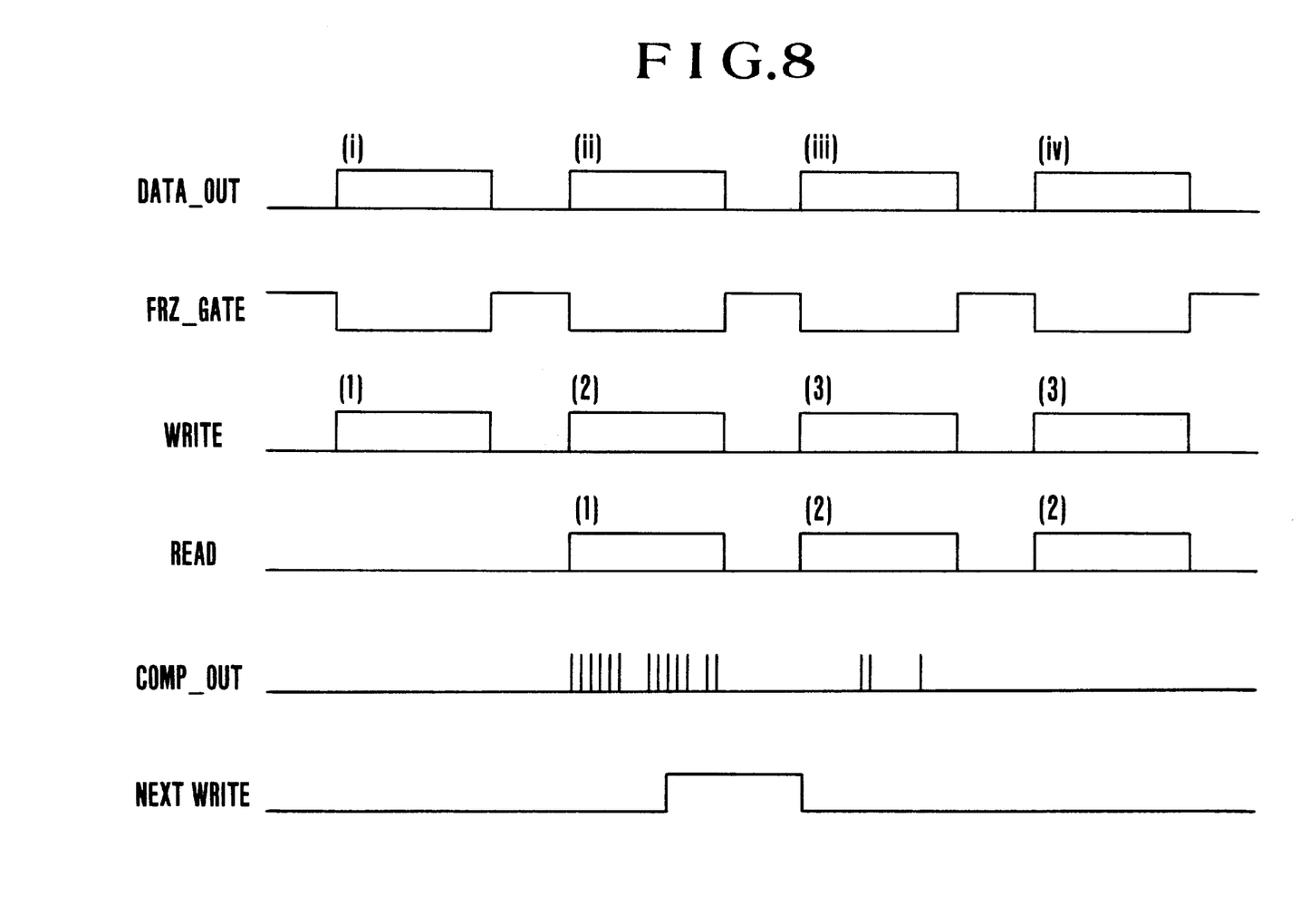
FIG. 8 is a timing chart showing the operation of each of the blocks of FIG. 7.

FIG. 8 is a timing chart showing writing to and reading from the memory 6 as well as the operation of the comparator 703.

The operation of the memory 6 will be described below with reference to FIGS. 7 and 8.

In brief, image data, which is read from the image sensor 3 each time one exposure is performed during continuous shooting, is compared with the previous data stored in the memory 6, and if no large variation is detected, the read data is not stored in the memory 6.

Referring to FIG. 8, at time (i), image data is outputted from the image sensor 3 and is stored in the area (1) on the memory 6. At the time (ii) of FIG. 8, while the next image data outputted from the image sensor 3 is being written into the area (2) on the memory 6, the controller 702 reads the image data stored in the area (1) at the time (i) and causes the comparator 703 to make a comparison between aforesaid next image data and the read image data. If a difference above a predetermined value is detected, one count enable pulse is outputted to the counter 704. If the value of the counter 704 is above the predetermined value, it is determined that a substantial variation has occurred between the respective images captured as the first and second exposures during continuous shooting. At this time, a signal (Next Write) for advancing a write address to the next location ((2)→(3)) is outputted from the counter 704 to the controller 702.

At the time (iii) of FIG. 8, writing of image data to the area (3) on the memory 6 and reading of the image data from the area (2) are performed, and a comparison between them is made.

If the value of the counter 704 is below the predetermined value and no variation in image is detected, the signal Next Write is not set to its high level.

At the time (iv), the controller 702 executes control so that writing of image data to the area (3) of the memory 6 and reading of image data from the area (2) are again performed. Thus, frozen images for sixteen exposures (pictures) are obtained.

In the above-described manner, while writing to and reading from the memory 6 are being performed in parallel, a comparison is made between currently written image data and image data written immediately before the currently written image data. If no substantial variation is detected between particular written image data and the previous written image data, the particular written image data is overridden and overwritten (discarded) during the next cycle of image-data reading. Accordingly, it is possible to achieve high-speed continuous shooting which permits recording of a continuously and visibly varying image.

Reproduction of the images recorded through the continuous shooting in the above-described manner will be described below. If the images are reproduced by a general still video player, it is possible to reproduce the sixteen pictures as a multiple picture in an instant.

During recording in the high-speed continuous shooting mode, the continuous shooting speed (interval time) and the number of the exposures recorded through the continuous shooting are recorded in a user area of ID (identification) data.

An operation executed during the reproducing mode will be described below with reference to FIG. 1.

The disk drive motor 27 is driven to rotate the video floppy disk 12. When the rotation of the video floppy disk 12 becomes stable, a reproduced signal enters the reproducing circuit 9 through the recording-reproducing head 11 and a corresponding one of the contacts of the switch 17. The reproduced signal is transmitted to the A-D converter 5 in the form of a luminance signal (Y) and a chrominance signal (C). Each of the luminance and chrominance signals (Y) and (C) is converted into a digital signal, and the digital signal is stored in the memory 6.

During this time, an ID signal is also reproduced so that the continuous shooting speed and the number of the exposures recorded through the continuous shooting can be identified.

Since it is necessary to insert borders between the images of the respective exposures while image data are being stored in the memory 6, data indicative of the borders (black or gray) are written into the memory 6 at horizontal-line locations determined by the number of the exposures.

When data for a series of continuous pictures are frozen in the above-described manner, the driving of the disk drive motor 27 is stopped. Then, the data are read from the memory 6 and outputted to a monitor through the DSP 7, the D-A converter 8 and the encoder 15.

FIGS. 9(a) to 9(d) show different manners of reproduction on the monitor.

Figure 9A:
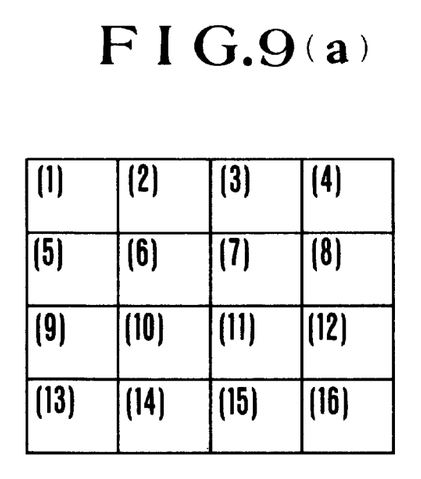
FIGS. 9(a), 9(b), 9(c) and 9(d) are views showing different manners of reproduction.

FIG. 9(a) shows the manner in which image data are reproduced in the order in which the image data were recorded.

Figure 9B:
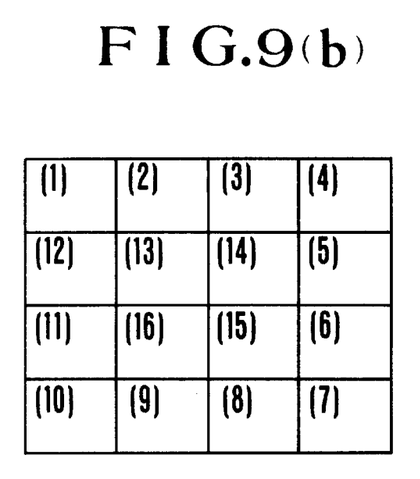

FIG. 9(b) shows the manner in which the image data are rearranged, as in the shown order, and reproduced in a frozen state so that a user can easily make a comparison between an arbitrary exposure and the next exposure, as in the case of stop-motion photography of a batting form for baseball.

Figure 9C:
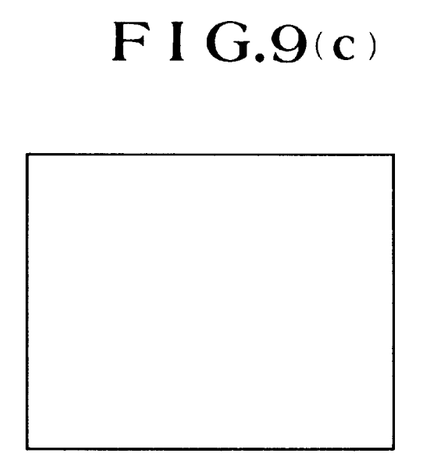

FIG. 9(c) shows the manner in which image data for one exposure is reproduced on the monitor as one picture at a time.

Figure 9D:
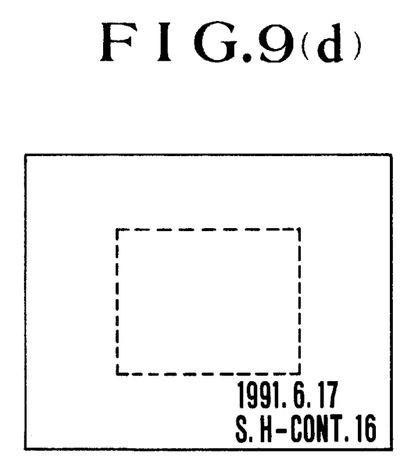

FIG. 9(d) shows the manner in which the screen of the monitor is provided with a white mask of shape which extends along the four sides of the monitor screen so that a reduced picture can be reproduced. The reproduction of the reduced picture is intended to prevent a coarse image from being reproduced. In the above-described embodiment, such a coarse image is reproduced if image data is restored as is thinned out, because simple thin-out processing is only used.

In the manner of reproduction shown in each of FIGS. 9(c) and 9(d), since it is possible to know a shooting speed at the time of reproduction of the ID signal, if reproduction is executed at a speed corresponding to the shooting speed, it is possible to continuously reproduce a series of exposures, whereby the motion of a subject can be reproduced as a flash motion.

Although, in the above-described embodiment, sixteen exposures are recorded as one continuous picture, it is also possible to adopt an arrangement which allows the user to specify a desired number of exposures such as nine exposures or twenty-five exposures. The interval time between successive exposures during photography may be newly set if a variation of a subject can be predicted or if it is necessary to observe variations which occur in the subject at predetermined time intervals. Since the range of variations of the interval time is limited in relation to the range of shutter speeds, it is desirable to issue a warning to the user when the interval time is to be reduced. Although the video floppy disk 12 is used as a recording medium, other recording media such as a memory card may be used. In the above-described embodiment, after images for sixteen exposures have been stored in the memory 6, recording on the video floppy disk 12 is performed. However, it is possible to adopt another arrangement in which if the switch SW2 26 is turned off before all the images for sixteen exposures are stored, recording is executed at that time. It is possible to adopt still another arrangement. For example, while the switch SW2 26 is on, the operation of storing image data in the memory 6 is continued, and image data for the first exposure is overwritten with image data for the seventeenth exposure so that the latest sixteen images are always stored. If the switch SW2 26 is turned off, the latest sixteen images at that time are recorded from the memory 6 onto the video floppy disk 12. Although, in the above-described embodiment, the comparator 703 uses a fixed level, it is also possible to adopt an arrangement which allows a photographer to set an arbitrary level.

During reproduction, if data indicative of borders are to be written into the memory 6 during storage in the memory 6 on the basis of the number of exposures, it is desirable to make the borders thicker than those written during recording. Although the above description refers to a technique for sequentially reproducing one at a time, it is also possible to adopt a far more effective arrangement which is capable of simultaneously reproducing four continuous exposures so that the user can select an arbitrary exposure from among the four continuous exposures.

In the above-described embodiment, a series of image data is once transferred to the video floppy disk 12 and is then reproduced therefrom. However, the present invention is not limited to this arrangement. For example, the present invention can be practiced in the form of outputting data read from a memory without using a video floppy disk. In the case of such a form, recording means may be externally provided or a reproduced output may be used as a soft copy.

As is apparent from the foregoing description, in accordance with the above-described embodiment, since high-speed reading is executed by thinning out the horizontal lines of one picture, it is possible to achieve far higher-speed continuous shooting.

In accordance with the above-described embodiment, if similar images continue, the corresponding video signals are discarded, so that it is possible to achieve high-speed continuous shooting which does not produce a useless exposure.

In accordance with the above-described embodiment, since images captured through the high-speed continuous shooting are reproduced at predetermined time intervals one exposure at a time, it is possible to reproduce the motion of a subject as a flash motion.

What is claimed is:

1. An image pickup apparatus comprising:
   (a) image pickup part for photoconverting an optical image into an electrical image signal and having a memory for storing said electrical image signal;
   (b) read out circuit for reading out a predetermined number of periodical lines from said image pickup part for forming each electrical image signal in a predetermined periodical pitch;
   (c) recording circuit for recording the electrical image signal read out from said image pickup part;
   (d) selector for selecting a still image shooting mode and a high-speed continuous shooting mode;
   (e) control circuit for changing said number of periodical lines read out from said image pickup part by thinning out a predetermined number of lines of said electrical image signal during a reading out operation when said high-speed continuous shooting mode is selected; and
   (f) horizontal thinning circuit for horizontally thinning out a part of the electrical image signal read out from said image pickup part in accordance with the thinning out of the predetermined number of lines.

2. An image pickup apparatus according to claim 1, wherein said recording circuit includes a solid-state memory.

3. An image pickup apparatus according to claim 1, wherein said recording circuit includes a magnetic memory.

4. An apparatus according to claim 1, wherein said control circuit reads out 1/n line of the image pickup part wherein n is 4 or more.

5. An image pickup apparatus comprising:
   (a) image pickup part for photoconverting an optical image into an electrical image signal and having a memory for storing said electrical image signal;
   (b) read out circuit for reading out a predetermined number of periodical lines from said image pickup part for forming each electrical image signal in a predetermined periodical pitch;
   (c) selector for selecting a still image shooting mode and a high-speed continuous shooting mode;
   (d) control means for changing said number of periodical lines read out from said image pickup part by thinning out predetermined lines of said electrical image signal and for horizontally thinning out a part of said electrical image corresponding to the thinning out of predetermined lines during a reading out operation when said high-speed continuous mode is selected; and
   (e) horizontal thinning circuit for horizontally thinning out a part of the electrical image signal read out from said image pickup part in accordance with the thinning out of the predetermined number of lines.

6. An apparatus according to claim 5, wherein said control circuit reads out 1/n line of the image pickup part where n is 4 or more.

7. An image pickup apparatus according to claim 5 further comprising recording circuit for recording said electrical image signal.

8. An image pickup apparatus according to claim 7, wherein said recording circuit includes a solid-state memory.

9. An image pickup apparatus according to claim 7, wherein said recording circuit includes a magnetic memory.

10. An image pickup apparatus comprising:
    (a) image sensor for producing an electrical image signal;
    (b) recorder for recording said electrical image signal;
    (c) selector for selecting a still image recording mode and a high speed continuous image recording mode; and
    (d) controller for changing a number of vertical pixels and horizontal pixels of said electrical image signal recorded by said recorder by changing vertical and horizontal reading pitch between said still image recording mode and said high speed continuous image recording mode,
    wherein said controller reduces the number of vertical pixels and horizontal pixels of said electrical image signal recorded by said recorder in said high speed continuous image recording mode than in said still image recording mode.

11. An apparatus according to claim 10, wherein said controller includes a thinning circuit.

* * * * *

UNITED STATES PATENT AND TRADEMARK OFFICE
CERTIFICATE OF CORRECTION

PATENT NO.    : 6,518,999 B1                                              Page 1 of 1
DATED         : February 11, 2003
INVENTOR(S)   : Ryosuke Miyamoto It is certified that error appears in the above-identified patent and that said Letters Patent is hereby corrected as shown below:

Column 1,
Line 38, before "In such an" delete as a new paragraph.

Column 4,
Line 54, delete "address-iris" and insert -- address·iris --.

Column 8,
Line 21, before "In the above-" insert a new paragraph indentation.

Signed and Sealed this

Second Day of December, 2003

JAMES E. ROGAN
*Director of the United States Patent and Trademark Office*